United States Patent [19]

Dennis

[11] Patent Number: 4,984,221

[45] Date of Patent: Jan. 8, 1991

[54] BOREHOLE ACOUSTIC LOGGING SYSTEM HAVING AUTOMATIC REFLECTION SIGNAL LEVEL CONTROL

[75] Inventor: Charles L. Dennis, Richardson, Tex.

[73] Assignee: Mobil Oil Corporation, Fairfax, Va.

[21] Appl. No.: 475,555

[22] Filed: Feb. 6, 1990

[51] Int. Cl.$^5$ ............................................. G01V 1/40
[52] U.S. Cl. ......................................... 367/69; 367/25; 367/95
[58] Field of Search ................. 367/25, 34, 69, 26, 367/190, 28, 95, 86, 29; 181/105

[56] References Cited

U.S. PATENT DOCUMENTS

| | | | |
|---|---|---|---|
| 2,813,590 | 11/1957 | McDonald | 181/0.5 |
| 2,849,075 | 8/1958 | Godbey | 181/0.5 |
| 3,340,953 | 9/1967 | Zemanek, Jr. | 181/0.5 |
| 3,369,626 | 2/1968 | Zemanek | 181/0.5 |
| 3,371,313 | 2/1968 | Zemanek, Jr. | 340/18 |
| 3,478,839 | 11/1969 | Zemanek, Jr. | 181/0.5 |
| 3,485,317 | 12/1969 | Patel | 181/15 |
| 3,503,038 | 3/1970 | Baldwin | 340/15.5 |
| 3,517,768 | 6/1970 | Straus | 181/0.5 |
| 3,518,679 | 6/1970 | Baldwin et al. | 340/18 |
| 3,718,204 | 2/1973 | Groenendyke | 181/0.5 |
| 3,728,672 | 4/1973 | Dennis et al. | 340/15.5 |
| 4,733,380 | 3/1988 | Hevira | 367/35 |
| 4,779,243 | 10/1988 | West | 367/87 |
| 4,780,857 | 10/1988 | Lyle et al. | 367/35 |

Primary Examiner—Ian J. Lobo
Attorney, Agent, or Firm—Alexander J. McKillop; Charles J. Speciale; George W. Hager, Jr.

[57] ABSTRACT

A borehole televiewer employs a transducer energized by repetitive voltage pulses for generating pulses of acoustic energy for transmission to the walls of a borehole and for detecting direct reflections of acoustic energy from the borehole walls. A detector converts the acoustic energy reflections into reflection signals. Those reflection signals are applied along with a reference signal representing a desired constant level for the peak amplitude of the reflection signals to an error amplifier. The output of the error amplifier controls the voltage pulses utilized to energize the transducer so as to maintain a constant level of peak amplitude for the reflection signals produced from the detected acoustic energy direction reflections from the borehole wall.

3 Claims, 3 Drawing Sheets

BOREHOLE ACOUSTIC LOGGING SYSTEM HAVING AUTOMATIC REFLECTION SIGNAL LEVEL CONTROL

BACKGROUND OF THE INVENTION

This invention relates to acoustic logging of boreholes and more particularly to a borehole logging system employing a borehole televiewer with automatic level control for the logging of the characteristics of the material forming the walls of the borehole.

In U.S. Pat. Nos. 3,371,313 to Zemanek; 3,485,317 to Patel; 3,503,038 to Baldwin; 3,518,679 to Baldwin et al; and 3,718,204 to Groenendyke there are disclosed methods of and apparatus for scanning the walls of a borehole with acoustic energy. In these patents a borehole televiewer logging tool employs a transmitter and a receiver of acoustic energy which are rotated within the borehole. The transmitter is cyclically energized to provide a beam of acoustic energy pulses for scanning the walls of the borehole. Reflected acoustic pulses are received by the receiver between transmitted acoustic pulses and are converted to reflection signals for recording on an electron beam display device. A sweep signal is generated each time the acoustic energy beam is rotated through a 360° scanning pattern. Such sweep signal is applied to the horizontal deflection plates of the display device to sweep an electron beam horizontally across the face of the display device. The reflection signals are applied to the Z-axis of the display device to intensity modulate the electron beam as the beam is swept across the face of the display device to provide a picture which is a function of the time or distance from the transmitter and receiver to the wall of the borehole and of the density of the borehole wall.

In both the above-described patents the combination of transducer rotation along with vertical movement of the borehole televiewer logging tool along the length of the borehole results in a continuous spiral of the borehole wall being scanned. The resulting display is a picture of the density of the material forming the walls of the borehole at different depth points. This scanning of the borehole wall permits the determination of the actual configuration of the borehole. In addition, it permits the determination of anomalies which may exist at different depths in the borehole. For example, these anomalies may be a fault or a fracture in the formations traversed by the borehole.

In the aforementioned patents, the transmitter is an acoustic transducer cyclically energized by a suitable voltage pulser. As shown in the aforementioned U.S. Pat. Nos. 3,485,317; 3,503,038 and 3,518,679, a particularly suitable pulser employs an oscillator, a rectifier and a capacitor. The capacitor is charged from a D.C. voltage supply. Each oscillator pulse causes the rectifier to conduct, thereby allowing the capacitor to discharge. A voltage generated by the discharge of the capacitor is coupled through a transformer to excite the transducer to generate an acoustic pulse.

Also in such patents, the acoustic reflections received by the transducer from the borehole walls are amplified and passed through a detector for producing an envelope of the amplified reflection signals. This envelope is applied to the Z-axis of a cathode ray tube display device.

Acoustic noise can be a problem when using the above described borehole logging systems since it is generally greater than electronic noise. It is therefore important to maintain as low an acoustic noise level as possible. In the aforementioned U.S. Pat. No. 3,518,679, the acoustic noise present in the detected reflection signals is lowered by use of a variable gain amplifier. However, in such patent the acoustic noise in the reflection signal is not reduced relative to the amplitude of the reflection signals but is merely a function of the gain selected. It is a specific object of the present invention to control the level of acoustic noise relative to the reflection signal irrespective of the gain to be applied to the reflection signal.

SUMMARY OF THE INVENTION

In accordance with the present invention there is provided apparatus for the acoustic logging of subsurface formations surrounding a borehole and more particularly to a borehole televiewer having automatic level control.

An elongated borehole tool employs an acoustic transducer for generating acoustic pulses for transmission to the walls of a borehole and for detecting acoustic energy reflected directly from the borehole walls while the tool is rotated and traversed along a select length of a borehole. A source of voltage pulses periodically supplies voltage pulses to the transducer for energizing the transducer to periodically generate the acoustic energy pulses. A detector converts the direct reflections of acoustic energy received by the transducer into reflection signals. A peak detector is employed to detect the peak amplitudes of the reflection signals and a low pass filter is employed to provide a first control signal representative of the average of the detected peak amplitudes of the reflection signals. This signal representing the average of peak amplitudes is applied along with a reference signal to an error amplifier, this reference signal represents a select amplitude level at which the reflection signals are to be controlled or maintained. The output of the error amplifier is an error signal which is applied to the source of voltage pulses for increasing the voltage of such pulses when the error signal increases in response to an increase in difference between the reference signal and the average of the peak amplitudes of the reflection signals and for decreasing the voltage of such pulses when the error signal decreases in response to a decrease in difference between the reference signal and the average of the peak amplitudes of the reflection signals. As the voltage of the pulses to the transducer is increased or decreased, the transducer increases or decreases accordingly the amount of acoustic energy transmitted so as to maintain the detected reflection signal amplitude at a constant level.

In a further aspect, the low pass filter has a time constant for the averaging of the peak amplitudes of the reflection signals over a time period of several seconds covering a plurality of revolutions of the borehole tool.

DESCRIPTION OF THE PREFERRED EMBODIMENT

For the purpose of illustrating the type of borehole acoustic logging system with which the apparatus of the present invention may be employed, a general description of the logging system shown in FIG. 1 will be first presented, following which details of the automatic level control feature of the present invention will be described.

Figure 1:
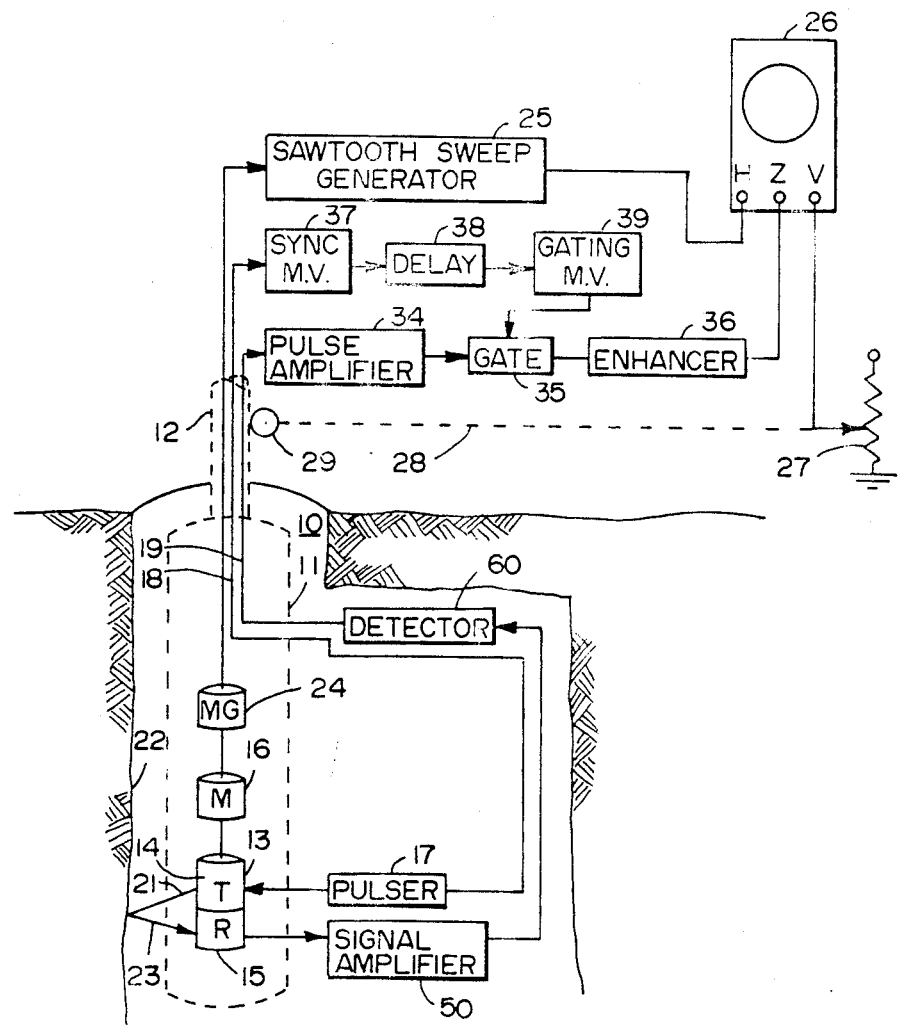
FIG. 1 illustrates a borehole televiewer logging system with which the automatic acoustic noise level control technique of the present invention may be practiced.

Referring now to FIG. 1, a borehole televiewer logging tool 11 is lowered into borehole 10 by means of a logging cable 12. Logging tool 11 comprises a transducer assembly 13 which acts as both a transmitter and receiver of acoustic energy. The beam of high frequency acoustic energy is rotated within the borehole to circularly scan the walls of the borehole. Such rotation is effected by means of motor 16. While it is understood that transducer assembly 13 comprises a separate transmitter 14 and a receiver 15, a single transducer acting both as transmitter and receiver may be utilized. The transducer assembly 13 is rotated about the borehole axis by means of motor 16. The frequency of the acoustic energy transmitted by way of beam path 21 toward the wall 22 of borehole 10 is determined by the pulser 17. Pulser 17 may, for example, produce in the order of 2,000 excitation pulses per second. Thereupon, transmitter 14 will produce an acoustic energy burst rate in the order of 2,000 bursts per second. A suitable frequency of the pulses of each acoustic energy burst may be, for example, 2 megahertz.

Logging tool 11 also includes a magnetometer 24, mounted for rotation with the logging tool 11, which produces an output pulse each time magnetic North is detected during rotation. Such magnetometer output pulse is applied uphole to sawtooth sweep generator 25 which provides a horizontal sweep signal to the horizontal deflection plates of an electron beam display device 26 for horizontally driving an electron beam across the face of display device 26.

Each horizontal sweep of the electron beam across the display device 26 is displaced vertically from the start of the sweep to the end of the sweep in proportion to the vertical movement of the logging tool 11 within the borehole 10. Such displacement is provided by means of a potentiometer 27 which is coupled by electromechanical linkage 28 to a sheave 29 over which logging cable 12 passes. Vertical advancement of logging cable 12 along the borehole axis rotates sheave 29, such rotation causing electromechanical linkage 28 to vary the location of the wiper arm on potentiometer 27, thereby applying to the vertical deflection plates of display device 26 a voltage which is proportional to the depth of the logging tool within the borehole. The resulting picture displayed on display device 26 is a series of side-by-side, substantially horizontal beams, the start of each beam trace located at the vertical position on the face of the display device where the preceding beam trace terminated.

Reflected acoustic energy pulses 23 are received by the receiver 15 of transducer assembly 13, and signals representative of such reflections are applied to the Z-axis of display device 26 by way of a signal amplifier 50 and detector 60, located downhole, and a pulse amplifier 34, gate 35, and enhancer 36 located on the surface of the earth. Such input to the Z-input terminal of display device 26 serves to intensity modulate the electron beam in accordance with the amplitudes of the reflection signals.

Ordinary logging cables are not suitable for transmission of high frequency signals, such as 2 megahertz, to the surface; therefore, after being amplified by signal amplifier 50, the reflection signals are applied to detector 60 which generates a lower frequency signal in the form of the envelope of the reflection signals. Such lower frequency signals, preferably in the range of 20–50 kilohertz, can be transmitted to the surface over ordinary logging cable without appreciable signal loss. The output of detector 60 is applied to the input of pulse amplifier 34 by means of conductor 19.

Pulser 17 also provides an output to a sync multivibrator 37, delay 38, and gating multivibrator 39. The output of gating multivibrator 39 is an indication of the time period between transmitted acoustic energy pulses and during which reflected acoustic energy pulses are expected to be received at receiver 15, such output being applied to gate 35 to allow reflecting signals to pass from pulse amplifier 34 through gate 35 and enhancer 36 to the modulating input of display device 26.

When pulser 17 generates an excitation pulse, a portion of this pulse cross-feeds into receiver 15. Also, when a sync pulse is generated by pulser 17 and sent uphole via conductor 18, a portion of the pulse cross-feeds into receiver conductor 19. To prevent these cross-feed signals from intensity modulating the electron beam of display device 26, gate 35 is open only during that portion of time during which reflected pulses are expected to be received from the walls of the borehole. Each time a sync pulse is received by sync multivibrator 37, it triggers into its unstable state for an output for a period of time almost as long as the time period between transmitted acoustic pulses. At the same time that the output of sync multivibrator 37 goes positive, a delay monostable multivibrator 38 is triggered into its unstable stage for a period of time ending just prior to the anticipated arrival time of a reflected pulse at receiver 15. As the trailing edge of the output of delay multivibrator 38 goes negative, a gating monostable multivibrator 39 is triggered into its unstable state to generate a positive-going output, which triggers gating multivibrator 39 to provide a signal to gate 35 to allow passage therethrough of only those signals representative of reflected pulses. Therefore, only the envelopes of the reflection signals pass through gate 35 to enhancer 36.

Having now described a borehole televiewer logging system with which the present invention may be practiced, reference is made to FIGS. 2–5 along with the following detailed description of the apparatus of the present invention for use in automatically controlling acoustic noise level during borehole acoustic logging operations with such a borehole televiewer logging system.

Figure 2:
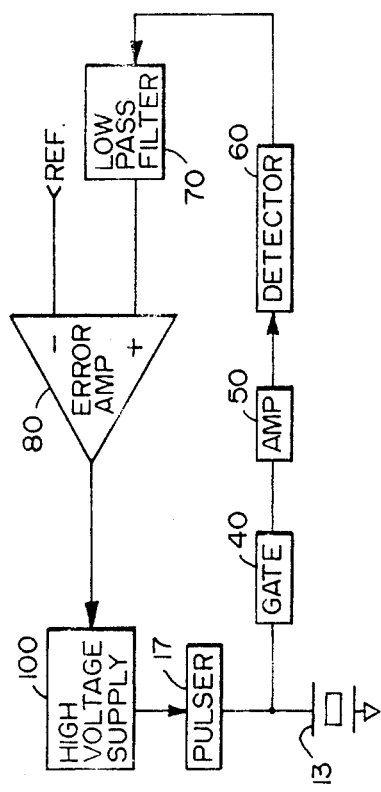
FIG. 2 is a block diagram of the automatic level control system of the present invention useful with the borehole televiewer of FIG. 1.

Referring firstly to FIG. 2, there is shown in block diagram form the automatic level control feature of the present invention for use with the borehole televiewer logging system of FIG. 1. The transducer 13 is energized with voltage pulses from the pulser 17 to direct acoustic energy pulses toward the borehole wall. During the transmission of acoustic energy, gate 40 is closed. Between such transmissions, gate 40 is open to permit acoustic energy reflections received by the transducer 13 from the borehole walls to be passed to the amplifier 50. A moderate gain of 200 by amplifier 50 is enough to raise the reflection signals produced by amplifier 50 to a level suitable for transmission up the logging cable 19 to the surface electronics. The amplified reflections are applied to a peak amplitude detector 60 which detects the peak amplitudes of the reflections and provides an output signal representative of the envelope of such reflection peaks. This envelope signal is applied to low pass filter 70 having a time constant suitable for averaging the reflection peaks of the envelope signal over a time period of several seconds, such as 20 seconds, for example. These time averaged reflection peaks are applied as a control signal to the non-inverting input of an error amplifier 80 which operates as a difference amplifier. Connected to the inverting input of error amplifier 80 is a DC reference signal in the order of 0 to 10 volts such as 5 volts for example. Error amplifier 80 provides an error signal representing voltage difference between such DC reference signal and the averaged reflection peaks of the envelope signal. The error signal 80 is applied to the high voltage source 100 for varying the high voltage supplied to the pulser 17 whenever the averaged peak amplitudes of the reflection envelope differs from the reference signal. For example, should such averaged peak amplitudes decrease in voltage below a reference of 5 volts, for example, error amplifier 80 provides an error signal for increasing the voltage out of the high voltage source 100 to the pulser 17, whereby pulser 17 provides increased energy to the transmitted acoustic energy pulses from transducer 13. Similarly, should the averaged peak amplitudes increase in voltage above the reference of 5 volts, error amplifier 80 provides an error signal for decreasing the voltage out of the high voltage source 100 to the pulser 17, whereby pulser 17 provides decreased energy to the transmitted acoustic energy pulses from transducer 13. In this manner, the variable output of the high voltage source controls the amount of acoustic energy transmitted by transducer 13 such that the reflection signals generated by the transducer 13 and amplifier 50 are maintained at a constant level with respect to the reference signal.

Figure 3:
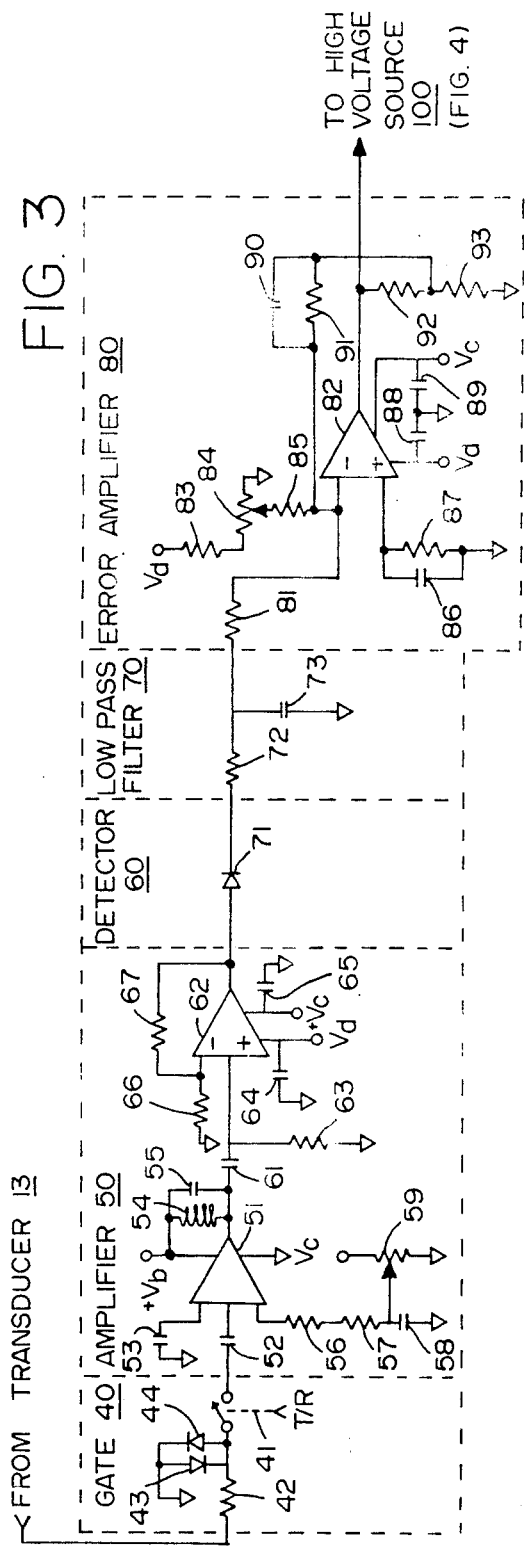
FIGS. 3–5 are electrical schematics of portions of the block diagram of FIG. 2.
Figure 4:
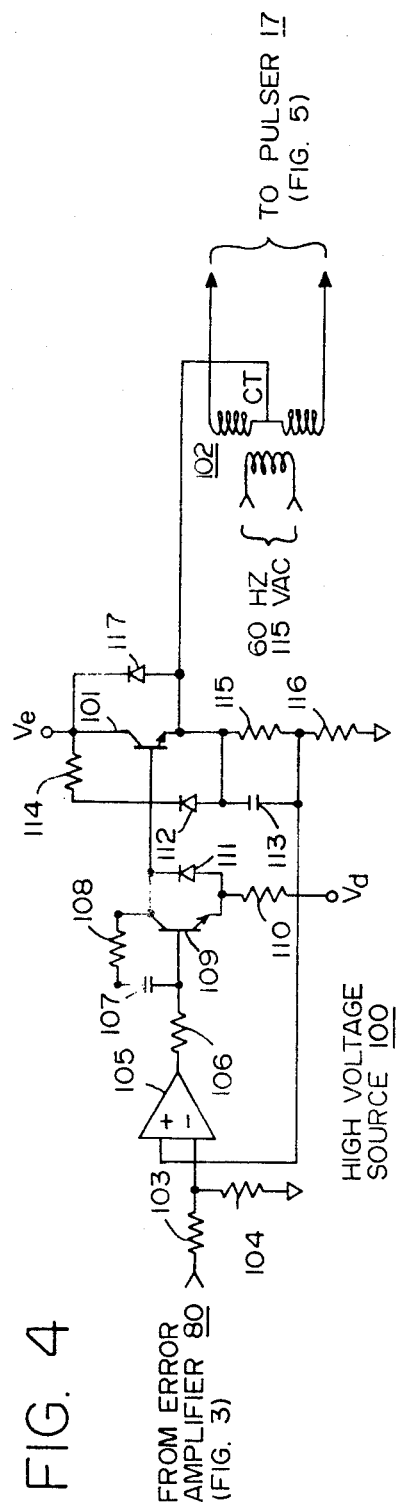
Figure 5:
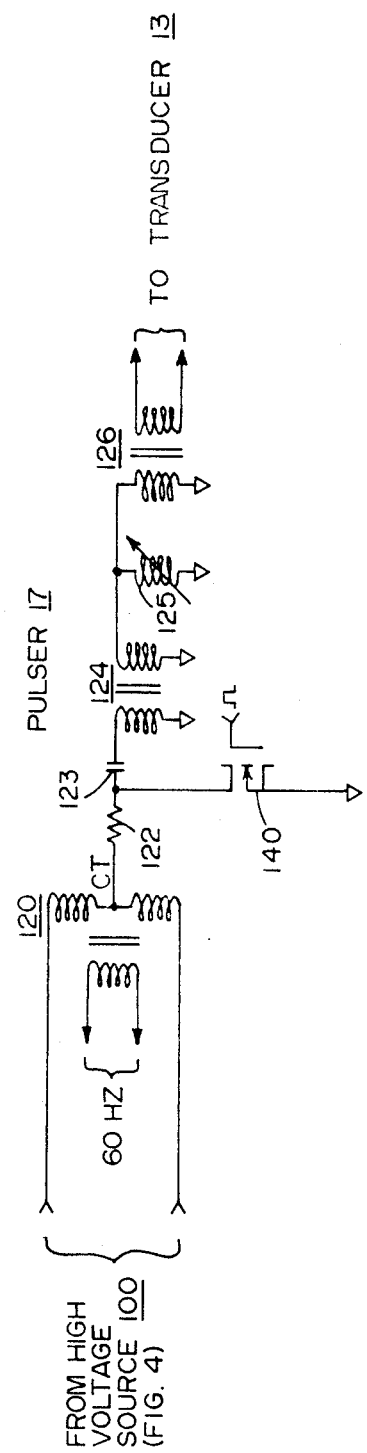

Having now described the overall operation of the circuitry of FIG. 2 in automatically controlling reflection signal level, reference is now made to FIGS. 3-5 for a more detailed description of such circuitry.

In FIG. 3 the reflections of acoustic energy from the borehole walls received by transducer 13 are coupled by an electronic gate 40 to amplifier 50. During transmission of acoustic energy pulses by transducer 13 a switch 41 is open to block the transducer output from amplifier 50. During reception of acoustic energy reflections by transducer 13 the switch 41 is closed to pass such reflections through to amplifier 50. This opening and closing of switch 41 is in response to a T/R signal derived from control circuitry not shown. Operational amplifiers 51 and 62 are biased to provide a gain of about 200 to the acoustic energy reflections. The output of amplifier 50 is then passed through diode detector 60 to a low acoustic energy pass filter 70 where resistors 72 and 81 and capacitor 73 average the reflections over the time period established by the time constant of the filter, such as about 20 seconds for example. Consequently, only the average of the peak amplitudes of the amplified reflection signals are passed on to error amplifier 80 where they are coupled to the inverting input of operational amplifier 82. Variable resistor 84 is adjusted to provide a desired reference voltage for comparison to the average peak reflection signals. Preferably, the voltage supply $V_d$ is selected such that the reference voltage is in the 0 to 10 volt range. The output of error amplifier 80 is an error signal that remains constant so long as the voltage difference between the reference voltage and average peak reflection signals remains constant and varies in direct response to variations in such voltage difference. Preferably the reference voltage is set at a voltage level equal to a desired voltage for the averaged peak amplitude reflection signals, 5 volts for example. In this case the error signal of amplifier 82 remains constant when such voltage difference is zero.

Error Amplifier 80 supplies its error signal to the high voltage source 100 shown in detail in FIG. 4. An important feature of high voltage source 100 is that it varies the high voltage to the pulser 17 so as to control the magnitude of acoustic energy transmitted by the transducer 13 in such a way that the amplified reflection signals are maintained at constant level. This is an important feature in that many borehole factors are operative in imparting gain drift to such signals. Various borehole conditions, such as borehole size, borehole fluid, temperature and pressure as well as electronic drift effect gain changes in the amplified reflection signals. In varying the high voltage to pulser 17 to compensate for such gain drift and thereby maintain a constant amplitude level for the amplified reflection signals, it is a specific feature of the invention to employ a linear control element, preferably in the form of an emitter follower semiconductor device 101. With the high voltage to the pulser linearly controlled, the borehole televiewer can also automatically control reflection signal amplitude as the televiewer is advanced along the length of a borehole past lithologies of varying rock hardness. Consequently level control is achieved for not only varying borehole conditions that impart gain drift, but also for varying lithology conditions that would change reflection amplitudes. A fixed high voltage supply $V_e$, such as 250 volts for example, is applied to the collector of emitter follower 101. The linear variable voltage out of the emitter of emitter follower 101 is transferred preferably from an uphole location of the high voltage source 100 to the pulser 17 preferably located in the borehole tool via a transformer center tap arrangement as shown at 102 in FIG. 4 and at 120 in FIG. 5. The transformers 102 and 120 provide the means for transferring general 60 Hz power to the tool (differentially) as well as delivering high voltage to the pulsar 17 from the high voltage source 100.

It is to be understood that the circuit components illustrated in the drawings are merely representative of one embodiment of the present invention. Particularly with respect to the embodiments of FIGS. 3-5, various types and values of circuit components may be utilized. In accordance with the specific embodiments of FIGS. 3-5 the following sets forth specific types and values of the circuit components.

| Reference Designation | | Description |
|---|---|---|
| Operational Amplifier | 51 | MC 1590 |
| Operational Amplifier | 62 | HA 2520 (Harris) |
| Operational Amplifier | 82 | TL 084 (T.I.) |
| Operational Amplifier | 105 | TL 084 (T.I.) |
| Electronic Switch | 41 | IH5051 (Harris) |
| FET Switch | 140 | IRF 330 (Intl. Rectifier) |
| Diode | 71 | HP2082 (Hewlett-Packard) |
| Diodes | 43, 44 | IN914 |
| Diodes | 111, 112, 117 & 121 | 4006 |
| Inductor | 54 | 50 μH |
| Inductor | 125 | Cambion #10 |

-continued

| Reference Designation | | Description |
| --- | --- | --- |
| Transistors | 101, 109 | 2N5657 |
| Transformer | 102 | Geotronics P-3724 |
| Transformer | 120 | Geotronics P-3735A |
| Transformer | 124 | UTC-H63 |
| Transformer | 126 | RT3 |
| Capacitor | 52 | 2200 pf |
| Capacitor | 55 | 0.012 μf |
| Capacitor | 61 | 1800 pf |
| Capacitor | 73 | 10 μf |
| Capacitor | 90 | 0.0012 μf |
| Capacitor | 107 | 0.82 μf |
| Capacitor | 113 | 0.0068 μf |
| Capacitor | 123 | 0.1 μf (600 v) |
| Capacitors | 53, 86, 88 & 89 | 0.1 μf |
| Capacitors | 58, 64 & 65 | 1.0 μf |
| Resistor | 42 | 4.99K |
| Resistor | 83 | 249K |
| Resistor | 87 | 301K |
| Resistor | 93 | 400 |
| Resistor | 114 | 47K |
| Resistor | 122 | 2.2K (2 w) |
| Resistors | 56, 68 | 20K |
| Resistors | 57, 103, 116 | 49.9K |
| Resistors | 59, 72, 84, 92, 106 & 108 | 10K |
| Resistors | 63, 66 & 110 | 1K |
| Resistors | 81, 85, 91, 104 & 115 | 1M |
| Voltage $V_b$ | | +12 VDC |
| Voltage $V_c$ | | +15 VDC |
| Voltage $V_d$ | | −15 VDC |
| Voltage $V_e$ | | +250 VDC |

What is claimed is:

1. A method for the acoustic logging of subsurface formations surrounding a bore hole, comprising the steps of:

(a) directing pulses of acoustic energy in a circular scanning pattern around the wall of said borehole and receiving direct reflections of said acoustic energy pulses from the wall of said borehole,
   (b) generating reflection signals representative of the acoustic energy of the direct reflections received from the borehole wall,
   (c) generating a reference signal representative of said reflected acoustic energy with borehole acoustic noise amplitude removed,
   (d) producing an error signal representative of amplitude differences between said reflection signals and said reference signal,
   (e) providing a voltage source with output varying in response to said error signal, and
   (f) utilizing the variable output of said voltage source to control the amount of acoustic energy directed from said transducer toward said borehole wall such that the generated reflection signals maintain a constant amplitude with respect to said reference signal so as to reduce the amplitude of the generated reflection signal by the amount of borehole acoustic noise amplitude.

2. The method of claim 1 wherein said step of producing an error signal comprises the steps of:

(a) detecting the peak amplitudes of said receiver signals produced following each periodically generated acoustic energy pulse, and
   (b) applying said peak amplitudes to a low pass filter having a time constant for the averaging of said peak amplitudes over a time period covering a plurality of circular scans of said borehole wall with said pulses of acoustic energy.

3. The apparatus of claim 2 wherein said time period is in the order of 20 seconds.

* * * * *